United States Patent

Freeman et al.

(10) Patent No.: US 9,677,405 B2
(45) Date of Patent: Jun. 13, 2017

(54) COMPOSITE GAS TURBINE ENGINE BLADE HAVING MULTIPLE AIRFOILS

(71) Applicants: Rolls-Royce Corporation, Indianapolis, IN (US); Rolls-Royce North American Technologies, Inc., Indianapolis, IN (US)

(72) Inventors: Ted J. Freeman, Danville, IN (US); Andrew J. Lazur, Huntington Beach, CA (US); Adam L. Chamberlain, Mooresviille, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 944 days.

(21) Appl. No.: 14/145,009

(22) Filed: Dec. 31, 2013

(65) Prior Publication Data

US 2015/0017002 A1 Jan. 15, 2015

Related U.S. Application Data

(60) Provisional application No. 61/772,805, filed on Mar. 5, 2013.

(51) Int. Cl.
*F01D 5/22* (2006.01)
*F01D 5/30* (2006.01)
*F01D 5/28* (2006.01)

(52) U.S. Cl.
CPC .......... *F01D 5/225* (2013.01); *F01D 5/282* (2013.01); *F01D 5/3007* (2013.01); *F05D 2230/60* (2013.01); *F05D 2300/6033* (2013.01); *Y02T 50/672* (2013.01); *Y10T 29/49321* (2015.01)

(58) Field of Classification Search
None
See application file for complete search history.

(56) References Cited

U.S. PATENT DOCUMENTS

| 3,325,144 A | 6/1967 | Light et al. |
| 3,632,460 A | 1/1972 | Palfreyman et al. |
| 4,098,559 A | 7/1978 | Price |
| 4,600,413 A | 7/1986 | Sugden |
| 5,211,540 A | 5/1993 | Evans |
| 5,273,401 A | 12/1993 | Griffin |
| 5,725,353 A | 3/1998 | Matheny et al. |

(Continued)

FOREIGN PATENT DOCUMENTS

| DE | 102008057190 A1 | 5/2010 |
| EP | 1526285 A1 | 4/2005 |

(Continued)

OTHER PUBLICATIONS

International Search Report for PCT International Application Serial No. PCT/US2013/078467, completed May 5, 2008.

*Primary Examiner* — Woody Lee, Jr.
(74) *Attorney, Agent, or Firm* — Barnes & Thornburg, LLP

(57) ABSTRACT

An apparatus includes a composite gas turbine engine multi-airfoil blade that includes first and second circumferentially spaced adjacent composite airfoils coupled together via a common composite attachment. The common attachment does not employ a fastener. The composite multi-airfoil blade may have a unitary construction having a ceramic matrix composition.

14 Claims, 3 Drawing Sheets

(56) References Cited

U.S. PATENT DOCUMENTS

| | | | |
|---|---|---|---|
| 5,735,673 A * | 4/1998 | Matheny | F01D 5/282 |
| | | | 416/223 A |
| 5,854,154 A | 12/1998 | Radford et al. | |
| 7,037,078 B2 * | 5/2006 | Soupizon | F01D 5/16 |
| | | | 29/889.1 |
| 9,045,992 B2 * | 6/2015 | Roussille | B29C 70/24 |
| 2010/0150725 A1 | 6/2010 | Krautheim | |
| 2013/0089429 A1 * | 4/2013 | Nunez | C04B 35/571 |
| | | | 416/230 |
| 2014/0314556 A1 * | 10/2014 | Fremont | B29C 70/222 |
| | | | 415/200 |

FOREIGN PATENT DOCUMENTS

| | | |
|---|---|---|
| EP | 1526285 B1 | 5/2013 |
| FR | 2946999 A1 | 12/2010 |
| FR | 2953885 A1 | 6/2011 |
| FR | 2976968 A1 | 12/2012 |
| JP | 59005806 | 12/1984 |
| JP | 2003148105 A | 5/2003 |
| WO | 9115357 A1 | 10/1991 |
| WO | 03029646 A1 | 4/2003 |
| WO | 2005011962 A1 | 2/2005 |
| WO | 2011002427 A1 | 1/2011 |

* cited by examiner

COMPOSITE GAS TURBINE ENGINE BLADE HAVING MULTIPLE AIRFOILS

CROSS REFERENCE TO RELATED APPLICATIONS

This application claims priority to and the benefit U.S. Provisional Patent Application No. 61/772,805, filed on Mar. 5, 2013, the disclosure of which is now expressly incorporated herein by reference.

TECHNICAL FIELD

The present application relates to composite gas turbine engine blades and more particularly, but not exclusively, to blades having multiple airfoils.

BACKGROUND

Providing for the attachment of composite gas turbine engine blades to rotor members remains an area of interest. Some existing systems have various shortcomings, drawbacks, and disadvantages relative to certain applications. Accordingly, there remains a need for further contributions in this area of technology.

SUMMARY

The present application discloses one or more of the features recited in the appended claims and/or the following features which, alone or in any combination, may comprise patentable subject matter.

One embodiment of the present application is a unique composite gas turbine engine blade having multiple airfoils coupled together via a single attachment. Other embodiments include unique methods, systems, devices, and apparatus to provide for space saving in the gas turbine engine rotor and/or improved stiffness to the turbine blade. Further embodiments, forms, objects, aspects, benefits, features, and advantages of the present application shall become apparent from the description and figures provided herewith.

These and other features of the present disclosure will become more apparent from the following description of the illustrative embodiments.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

Figure 1:
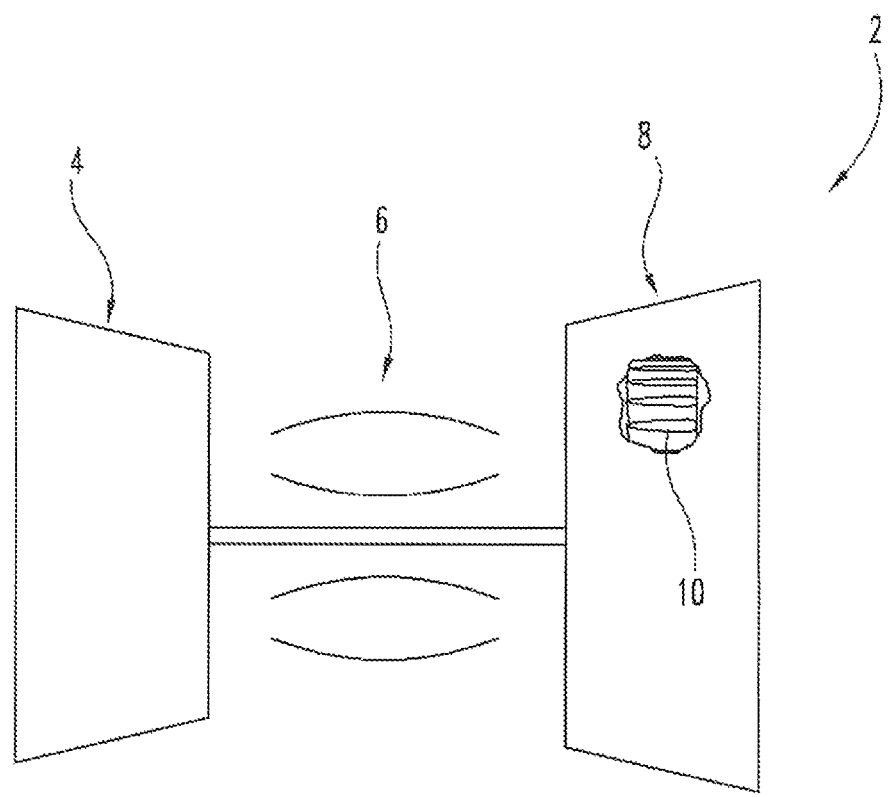
FIG. 1 shows a composite gas turbine engine including a turbine blade according to an embodiment.

While the present invention can take many different forms, for the purpose of promoting an understanding of the principles of the invention, reference will now be made to the embodiments illustrated in the drawing and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

With reference to FIG. 1, there is illustrated a schematic representation of one form of an aircraft gas turbine engine 2 used as a powerplant for an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosure is contemplated for utilization in other applications that may not be coupled with an aircraft such as, for example, industrial applications, power generation, pumping sets, naval propulsion and other applications known to one of ordinary skill in the art.

The gas turbine engine 2 includes a compressor section 4, a combustion section 6, and a turbine section 8. The as-shown gas turbine engine 2 comprises a single spool engine. As will be appreciated, the gas turbine engine 2 is not limited to the configuration shown in FIG. 1, and other embodiments are contemplated. For example, the gas turbine engine 2 can comprise a multi-spool engine, a high bypass ratio (BPR) engine, an engine having a low pressure (LP) spool, an engine having a high number of blades in the later stages of its LP turbine, among others. In other embodiments, the gas turbine engine 2 may have other configurations suited to the particular application of the aircraft.

Figure 2:
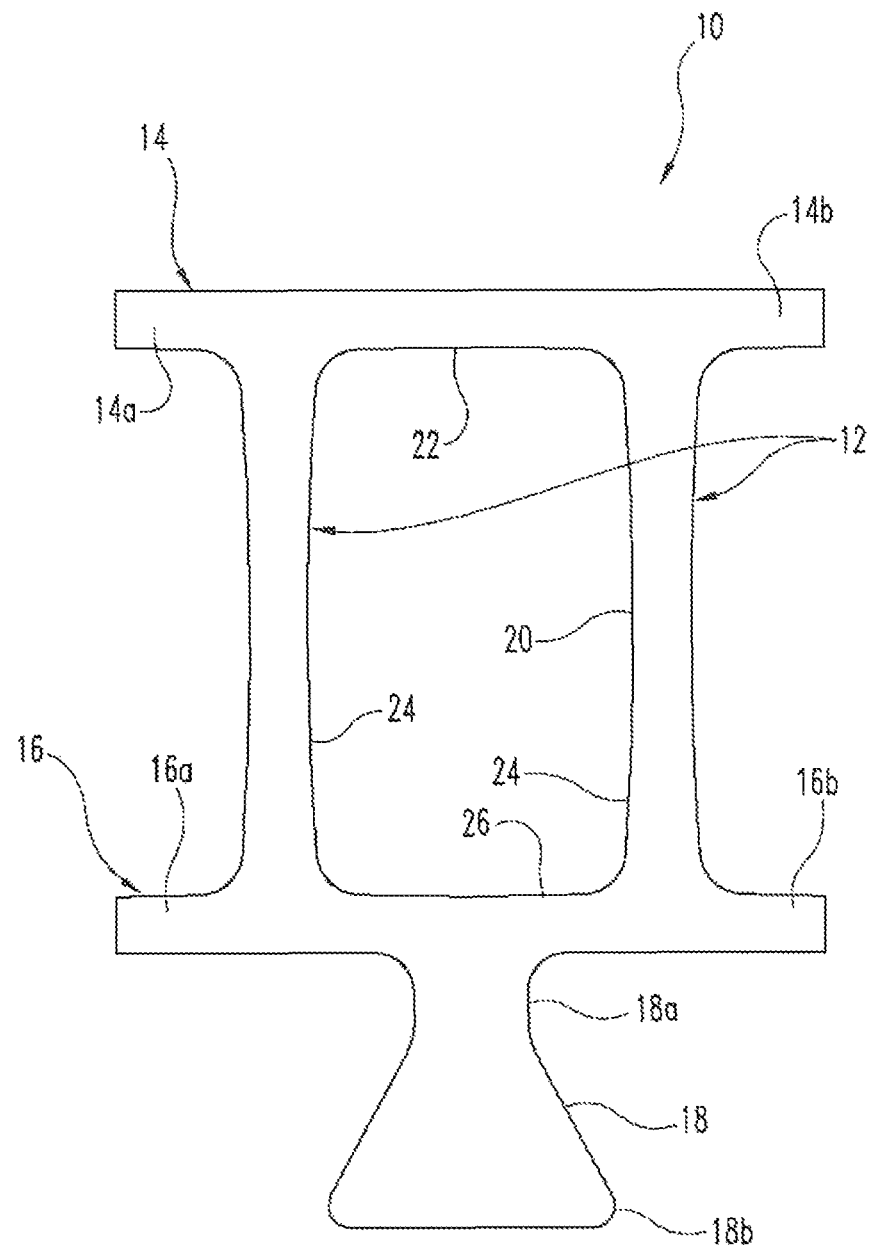
FIG. 2 is an axial cross-sectional view of a composite turbine blade according to an embodiment.

The turbine section 8 includes a rotor (not shown) and a plurality of composite turbine blades 10 attached thereto. A composite turbine blade 10 according to an embodiment is shown in FIG. 2, which is a cross-section of the composite turbine blade 10 as viewed in a plane perpendicular to the axis of the gas turbine engine 2. As will be appreciated, the composite turbine blade 10 described herein is not limited to use in the turbine section 8 of the gas turbine engine 2 and/or to use as a blade. Other applications and sections of the gas turbine engine 2 are also contemplated herein. For example, the composite turbine blade 10 may be used in the compressor section 4 and/or the turbine section 8 of the gas turbine engine 2, and/or may be used in a rotor or stator, and/or as a blade or a vane.

In the illustrated embodiment, the composite turbine blade 10 includes first and second circumferentially spaced radially extending adjacent airfoils 12. The composite turbine blade 10 is not limited to a two airfoil construction and other multi-airfoil constructions are contemplated; for example a three airfoil construction or other multi-airfoil construction may be suitable for a gas turbine engine application. The composite turbine blade 10 further includes a circumferentially extending tip shroud 14, a circumferentially extending platform 16, and a single attachment section 18 located radially inward of the airfoils 12 for attaching the composite turbine blade 10 to a rotor, for example. In one form, the tip shroud 14 circumferentially abuts the tip shrouds of adjacent turbine blades, and the platform 16 circumferentially abuts the platforms of adjacent turbine blades. It is contemplated that the composite turbine blade 10 discussed herein may be implemented without the tip shroud 14 and/or the platform 16, as described in greater detail below.

The attachment section 18 includes a radially outer portion that is coupled to the two adjacent airfoils 12 and a radially inner portion root. The root fits in a correspondingly shaped slot in a rotor of the gas turbine engine 2 to couple the composite turbine blade 10 to the rotor. The rotor has a plurality of such slots spaced about its circumference and extending axially through the rotor. The slots receive the corresponding roots of the attachment sections 18 of the composite turbine blades 10. The composite turbine blades 10 may thus be inserted slidably into and removed from the rotor via the roots of the attachment sections 18.

The adjacent airfoils 12 are coupled commonly to the radially outer portion of the attachment section 18, and thus only a single attachment section 18 is used for supporting the adjacent airfoils 12. Since the composite turbine blade 10 may have two adjacent airfoils 12 on a single attachment section 18 that is only slightly larger than an attachment typically required for a single airfoil, this common attachment feature may result in a space and/or weight savings in the rotor of the turbine section 8 of the gas turbine engine 2. In the FIG. 2 embodiment, for example, space savings is provided by the root of the attachment section 18 having a circumferential span that is less than the circumferential span between the adjacent airfoils 12. The space savings can be utilized, for example, for attachments in the rotor and/or to increase the blade count in the turbine section 8 if necessary or desired.

As will be appreciated, the attachment section 18 of the illustrated embodiment does not employ a fastener such as a nut and bolt pair. Rather, as shown for example in FIG. 2, the attachment section 18 provides the radially inner portion, or root, that is axially slidable within a slot of the rotor. The construction of the radially inner portion, or root, is such that the root need not include any provisions for a fastener. The root can have a relatively narrow portion 18*a* and a relatively wide portion 18*b* so that when the root is inserted into a correspondingly shaped slot in the rotor, the rotor prevents motion of the composite turbine blade 10 transverse to the insertion direction that is radially outward from the axis of the gas turbine engine 2. In the FIG. 2 embodiment, the root has a single lobe dovetail shape in cross-section although other shapes such as but not necessarily limited to, a multi-lobed fir tree shape are also contemplated.

The composite turbine blade 10 may have a one-piece unitary configuration for ease of manufacture and strength. This unitary configuration may include for example a box-like structure 20 as shown in FIG. 2 that includes a pair of circumferentially spaced walls 24 that form the two adjacent airfoils 12, a radially outer wall 22 that couples the radially outer portions of the two adjacent airfoils 12, and a radially inner wall 28 that couples the radially inner portions of the two adjacent airfoils 12 and forms the radially outer portion of the attachment section 18. In the embodiment shown in FIG. 2, the radially outer wall 22 also forms the tip shroud portions 14*a*, 14*b* that project circumferentially in opposite directions from the radially outer portions of the two adjacent airfoils 12, and the radially inner wall 26 also forms platform portions 16*a*, 16*b* that project circumferentially in opposite directions from the radially inner portions of the two adjacent airfoils 12, that is in opposite directions from the radially outer portion of the attachment section 18.

Figure 3:
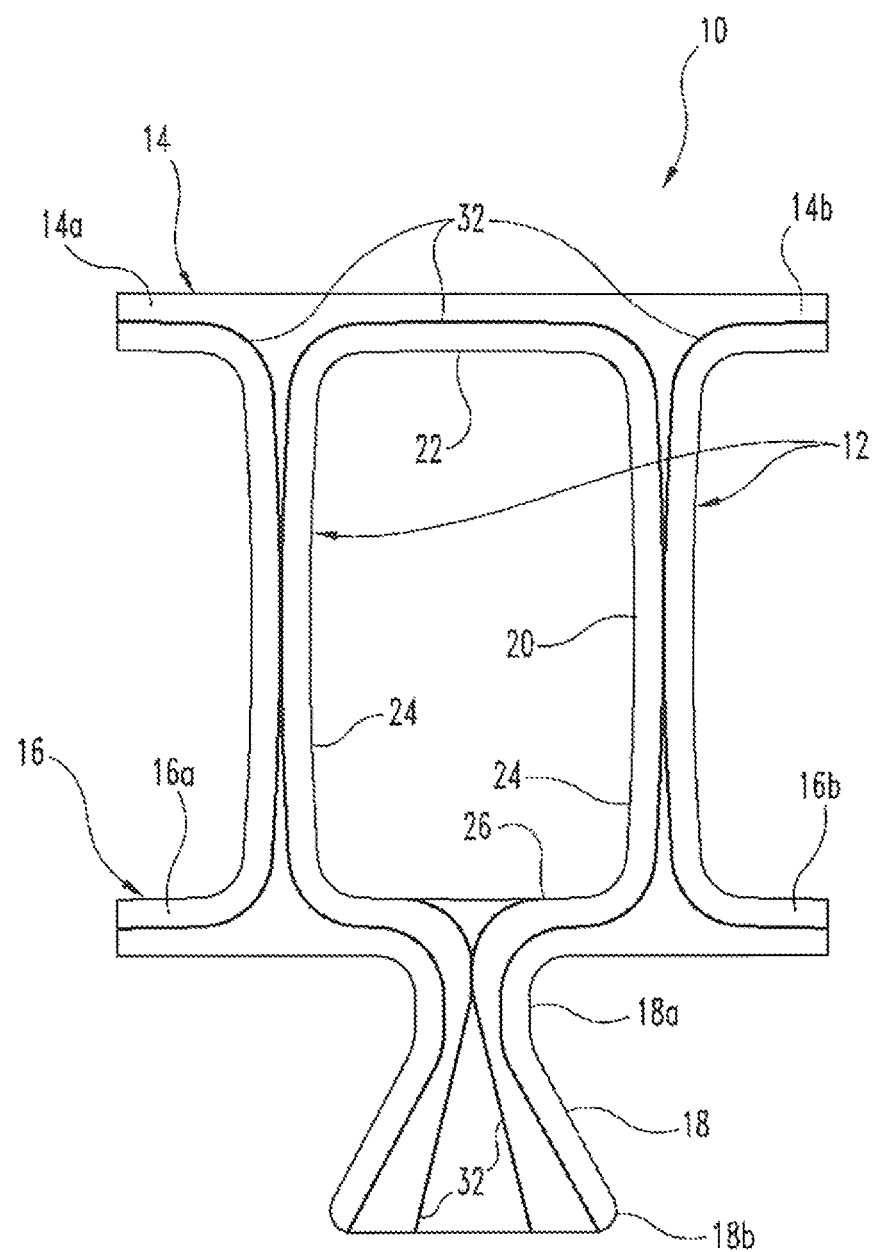
FIG. 3 is an axial cross-sectional view of a composite turbine blade according to an embodiment.

The integral construction of the composite turbine blade 10 can be accomplished in any of a variety of ways. The choice of material and process may depend on for example the location in the gas turbine engine 2 and/or the temperature of the gas turbine engine application. In one form, the composite turbine blade 10 can be fabricated from a polymer matrix composite; in another form, the composite turbine blade 10 can be fabricate from a ceramic matrix composite. Thus, for example, FIG. 3 shows the composite turbine blade 10 in the form of a ceramic matrix composite in which the lines 32 represent for example one or more plies of fabric. In the CMC process of manufacturing the composite turbine blade 10, a suitable technique such as polymer immersion pyrolysis (PIP) or chemical vapor infiltration (CVI) may be used. The reinforcement fabric in the CMC may be a ceramic material. In one form, the reinforcement fabric comprises silicon carbide.

The box-like structure 20 provides a stiffening function to the composite turbine blade 10, as it includes a single outer wall 22, or a single tip shroud 14 as in the illustrated embodiment, that couples the radially outer portions of the two adjacent airfoils 12. In an embodiment, this coupling of the radially outer portions of the two adjacent airfoils 12 is stiffer than for example a single airfoil having a tip shroud that locks-up with the airfoils that are circumferentially adjacent to it. Further, in an embodiment, the two adjacent airfoils 12 can be coupled together by the common outer wall 22, or the common tip shroud 14 as illustrated, so as to raise the modal frequencies and/or eliminate some modes.

As illustrated, the airfoils 12, tip shroud 14, platform 16, and attachment section 18, can be integrally formed to comprise a unitary member composite turbine blade 10. However, the unitary member composite turbine blade 10 can alternatively have components that attach to the composite turbine blade 10. For example, the tip shroud 14 can be a component that attaches to the radially outer portions, or tips, of the adjacent airfoils 12, and/or to the radially outer wall 22 of the box-like structure 20 of the composite turbine blade 10, to form the composite turbine blade 10. Likewise, the platform 16 may be a component that attaches to the radially inner portions of the airfoils 12 and/or the radially outer portion of the attachment section 18 of the composite turbine blade 10, to form the composite turbine blade 10. In an additional or alternative embodiment, the platform 16 is separate from and not coupled to the radially inner portions of the airfoils 12 and/or the radially outer portion of the attachment section 18 of the composite turbine blade 10; thus, the platform 16 has its own means of attachment to the rotor, for example via its own root, and can be disposed for example between circumferentially adjacent composite turbine blades 10. In an additional or alternative embodiment, the composite turbine blade 10 has a radially outer wall 22 but no tip shroud 14; or neither a tip shroud 14 nor a radially outer wall 22. In a further embodiment, the composite turbine blade 10 may include the adjacent airfoils 12 and the attachment section 18, but have neither a tip shroud 14 nor a platform 16.

Any theory, mechanism of operation, proof, or finding stated herein is meant to further enhance understanding of embodiment of the present invention and is not intended to make the present invention in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow.

What is claimed is:

1. An apparatus comprising:
a gas turbine engine airflow directing component having a composite material composition,
the composite airflow directing component including a plurality of elongate composite airfoil members that share a single common composite stalk, and a platform connected to the common stalk and the plurality of elongate airfoil members,
wherein the common stalk has a lobed attachment for insertion into a receptacle of a wheel of a gas turbine engine that prevents motion of the lobed attachment transverse to the insertion direction, wherein the lobed attachment has a dovetail shape in cross-section or a fir tree shape in cross section, and
wherein the platform is formed integrally with at least one of the common stalk and the plurality of elongate airfoil members by at least one unitary reinforcement ply extending radially and forming portions of each of the platform and at least one of the common stalk and the plurality of elongate airfoil members.

2. The apparatus of claim 1 in which the composite material composition comprises a ceramic matrix composite.

3. The apparatus of claim 1 comprising a tip shroud connected to radially outer portions of the plurality of elongate airfoil members.

4. The apparatus of claim 3 in which the tip shroud is integral with the radially outer portions of the plurality of elongate airfoil members.

5. A gas turbine engine comprising:
a wheel defining a receptacle therein; and
the apparatus of claim 1 in which the lobed attachment of the stalk is captured in the receptacle of the wheel.

6. The apparatus of claim 1, wherein the number of reinforcement plies comprises fabric.

7. The apparatus of claim 6, wherein the number of reinforcement plies includes silicon carbide.

8. The apparatus of claim 1, wherein the platform is formed integrally with each of the common stalk and the plurality of elongate airfoil members.

9. The apparatus of claim 1, wherein the platform is formed integrally with each of the common attachment root and the multiple blades.

10. A method of assembling a gas turbine engine airfoil to a gas turbine engine rotor, comprising:

providing a rotor defining a slot having a relatively narrow upper portion and a relatively wide lower portion;

providing a gas turbine engine airfoil including an airflow directing component formed of a composite material composition, the airflow directing component including multiple blades coupled to a platform and a common attachment root having one of a fir tree and a dovetail shape corresponding, to the slot of the rotor, the platform including a number of unitary reinforcement plies extending radially and forming portions of each of the platform and at least one of the common attachment root and the blades; and attaching the gas turbine engine airfoil to the rotor by inserting the common attachment root of the gas turbine engine airfoil into the corresponding shape slot of the rotor.

11. The method of claim 10 in which the providing the gas turbine engine airfoil comprises providing shroud portions projecting circumferentially outward from radially outer portions of the multiple blades.

12. The apparatus of claim 10, wherein the number of reinforcement plies comprises fabric.

13. The apparatus of claim 12, wherein the number of reinforcement plies includes silicon carbide.

14. An apparatus comprising:

a gas turbine engine airflow directing component having a composite material composition, the composite airflow directing component including a plurality of elongate composite airfoil members that share a single common composite stalk, and a platform connected to the common stalk and the plurality of elongate airfoil members, wherein the common stalk has a lobed attachment for insertion into a receptacle of a wheel of a gas turbine engine that prevents motion of the lobed attachment transverse to the insertion direction, wherein the lobed attachment has a dovetail shape in cross-section or a fir tree shape in cross-section, and wherein the platform is formed integrally with at least one of the common stalk and the plurality of elongate airfoil members by at least one reinforcement ply extending radially and including a first section forming a portion of the platform and a second section forming a portion of at least one of the common stalk and the plurality of elongate airfoil members.

* * * * *